United States Patent
Ponnuru et al.

(10) Patent No.: US 12,407,721 B2
(45) Date of Patent: Sep. 2, 2025

(54) WORKSPACE-BASED FIXED PASS-THROUGH MONITORING SYSTEM AND METHOD FOR HARDWARE DEVICES USING A BASEBOARD MANAGEMENT CONTROLLER (BMC)

(71) Applicant: Dell Products, L.P., Round Rock, TX (US)

(72) Inventors: Viswanath Ponnuru, Bangalore (IN); Rama Rao Bisa, Bangalore (IN); Chandrasekhar Mugunda, Austin, TX (US); Vineeth Radhakrishnan, Bangalore (IN); Shinose Abdul Rahiman, Bangalore (IN); Dharma Bhushan Ramaiah, Bengaluru (IN); Krishnaprasad K, Bengaluru (IN)

(73) Assignee: Dell Products, L.P., Round Rock, TX (US)

(*) Notice: Subject to any disclaimer, the term of this patent is extended or adjusted under 35 U.S.C. 154(b) by 969 days.

(21) Appl. No.: 17/381,641

(22) Filed: Jul. 21, 2021

(65) Prior Publication Data
US 2023/0009470 A1    Jan. 12, 2023

(30) Foreign Application Priority Data
Jul. 8, 2021    (IN) .............................. 202111030705

(51) Int. Cl.
H04L 9/30         (2006.01)
G06F 11/14       (2006.01)
H04L 9/40         (2022.01)
H04L 29/06       (2006.01)

(52) U.S. Cl.
CPC ........ H04L 63/1466 (2013.01); G06F 11/141 (2013.01); H04L 63/0218 (2013.01); G06F 2201/86 (2013.01)

(58) Field of Classification Search
CPC ............. H04L 63/1466; H04L 63/0218; G06F 11/141; G06F 2201/86
See application file for complete search history.

(56) References Cited

U.S. PATENT DOCUMENTS

| | | | |
|---|---|---|---|
| 2014/0173600 A1* | 6/2014 | Ramakrishnan Nair | G06F 9/45533 718/1 |
| 2015/0268970 A1* | 9/2015 | Mudusuru | G06F 9/4411 713/1 |
| 2020/0143047 A1* | 5/2020 | Shivanna | H04L 9/3247 |
| 2021/0390179 A1* | 12/2021 | Hahn | G06F 21/71 |

* cited by examiner

Primary Examiner — Wasika Nipa
(74) Attorney, Agent, or Firm — Fogarty LLP

(57) ABSTRACT

An Information Handling System (IHS) includes multiple hardware devices, and a baseboard Management Controller (BMC) in communication with the plurality of hardware devices. The BMC includes executable instructions for monitoring the operating characteristics a hardware device that is operating in a fixed pass-through configuration with a workspace in which the workspace has been instantiated by a workspace orchestration service executed on the IHS. The executable instructions may determine that the operating characteristics are indicative of a security breach of the fixed pass-through configuration, and as such, may perform an operation to quarantine the one hardware device when the fixed pass-through configuration is determined to possess the security breach.

12 Claims, 8 Drawing Sheets

WORKSPACE-BASED FIXED PASS-THROUGH MONITORING SYSTEM AND METHOD FOR HARDWARE DEVICES USING A BASEBOARD MANAGEMENT CONTROLLER (BMC)

CROSS REFERENCE TO RELATED APPLICATIONS

This patent application claims priority to co-pending, commonly assigned Indian Patent Application No. 202111030705, filed Jul. 8, 2021 and entitled "Workspace-Based Fixed Pass-Through Monitoring System and Method for Hardware Devices Using a Baseboard Management Controller (BMC);" the entire contents of which are incorporated by reference herein.

FIELD

This disclosure relates generally to Information Handling Systems (IHSs), and more specifically, to a workspace-based fixed pass-through monitoring system and method for hardware devices using a baseboard management controller (BMC).

BACKGROUND

An Information Handling System (IHS) generally refers to any computing system that processes, compiles, stores, and/or communicates information or data for business, personal, or other purposes. Modern day IHS administrative management is often provided via baseboard management controllers (BMCs). The baseboard management controller (BMC) generally includes a specialized microcontroller embedded in the IHS, and may provide an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take certain corrective actions, such as resetting or power cycling the system to get a hung O/S running again. These abilities can often save on the total cost of ownership of an IHS, particularly when implemented in large clusters, such as server farms.

Many IHSs provide users with capabilities for accessing, creating, and manipulating data. IHSs often implement a variety of security protocols in order to protect this data during such operations. A known technique for securing access to protected data that is accessed via an IHS is to segregate the protected data within an isolated software environment in the form of a workspace that operates on the IHS, where such isolated software environments may be referred to by various names, such as virtual machines (VMs), containers, dockers, etc. Various types of such workspaces are isolated by providing varying degrees of abstraction from the underlying hardware and from the operating system of the IHS. The workspace is capable of instantiating multiple instances of guest operating systems (OSs) on the same "bare-metal" IHS using a supervisory software layer commonly referred to as a hypervisor, which may be interchangeably referred to as a host.

To enhance the performance of VMs, a fixed pass-through feature was implemented that directly assigned certain hardware devices (e.g., graphics processors, network interface cards (NICs), storage controllers, etc.) to a VM. For example, processor vendors added hardware support for device virtualization, such as VT-d provided by INTEL and I/O management unit (IOMMU) provided by AMD. This feature allows a single guest OS instance to exclusively own a hardware device. Moreover, other VMs concurrently running on the IHS would be inhibited from using any hardware device that was currently operating in a fixed pass-through configuration. This configuration allows a single guest OS to achieve close to native performance for the hardware device. PCIe pass-through is one example of a fixed pass-through configuration that has been implemented for use on PCIe system buses.

SUMMARY

An Information Handling System (IHS) includes multiple hardware devices, and a baseboard Management Controller (BMC) in communication with the plurality of hardware devices. The BMC includes executable instructions for monitoring the operating characteristics of a hardware device that is operating in a fixed pass-through configuration with a workspace in which the workspace has been instantiated by a workspace orchestration service executed on the IHS. The executable instructions may determine that the operating characteristics are indicative of a security breach of the fixed pass-through configuration, and as such, may perform an operation to quarantine the one hardware device when the fixed pass-through configuration is determined to possess the security breach.

According to another embodiment, a method includes the steps of monitoring one or more operating characteristics of one or more hardware devices that is operating in a fixed pass-through configuration with a workspace using a Baseboard Management Controller (BMC). The hardware devices are configured in an Information Handling System (IHS). Additionally, the workspace has been instantiated by a workspace orchestration service executed on the IHS. The method further includes the steps of determining that the operating characteristics are indicative of a security breach of the fixed pass-through configuration, and performing an operation to quarantine the one hardware device when the fixed pass-through configuration is determined to possess the security breach.

According to yet another embodiment, an Information Handling System (IHS) includes first and second hardware devices in which the first hardware device includes executable instructions to monitor the operating characteristics of the second hardware device that is operating in a fixed pass-through configuration with a workspace. The workspace has been instantiated by a workspace orchestration service executed on the IHS. The instructions may also determine that the operating characteristics are indicative of a security breach of the fixed pass-through configuration, and as such perform an operation to quarantine the second hardware device when the fixed pass-through configuration is determined to possess the security breach.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
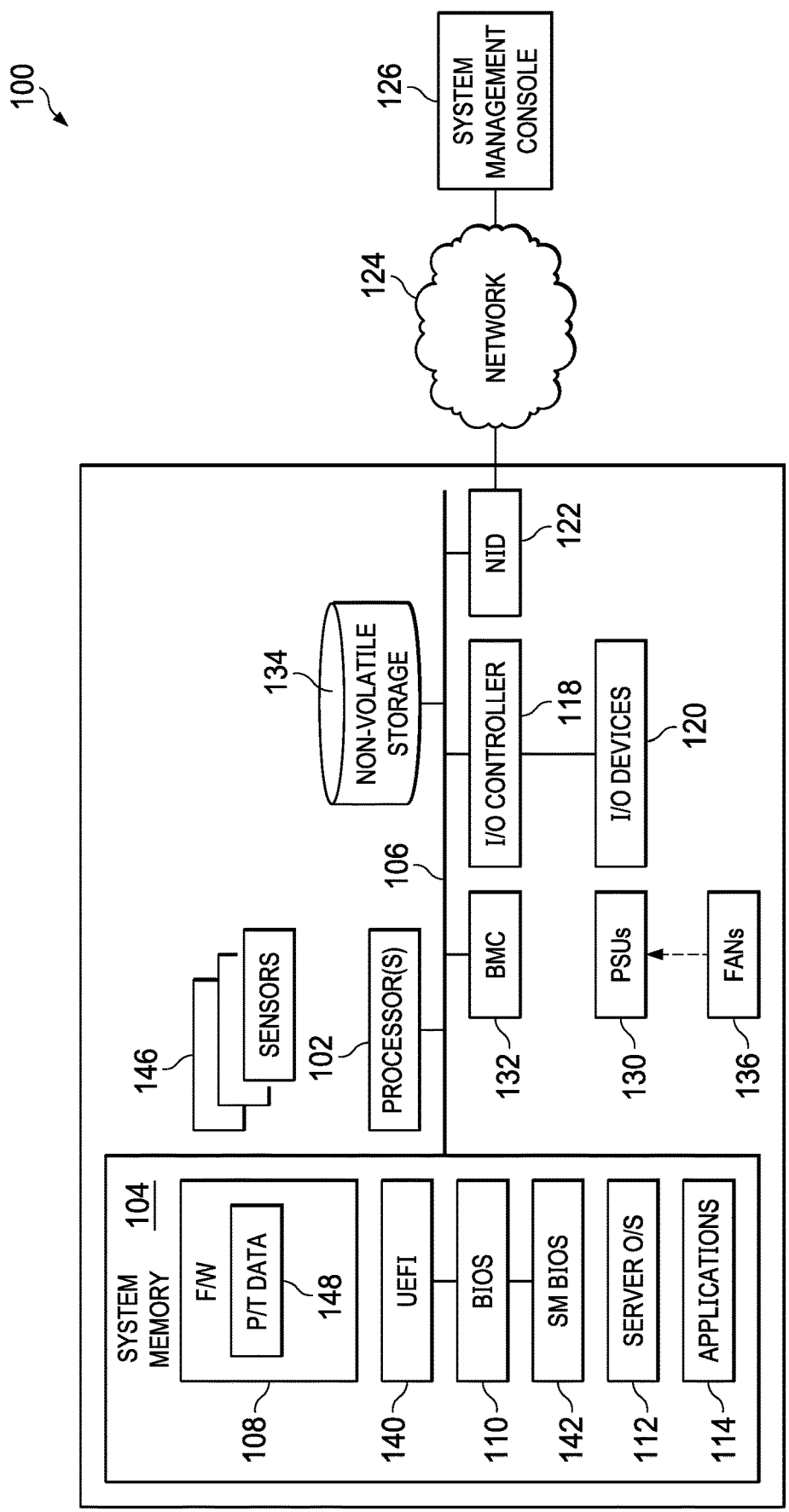
FIG. 1 shows an example IHS configured to implement a workspace-based fixed pass-through monitoring system and method for hardware devices using a baseboard management controller (BMC).

Embodiments of the present disclosure provide a workspace-based fixed pass-through monitoring system and method for hardware devices of an information handling system (IHS) using a baseboard management controller (BMC). While fixed pass-through configurations may allow a hardware device to operate at near native performance, their use has engendered certain security threats due at least in part to their lack of transparency from other components whose purpose exists to ensure protection from those security threats. Embodiments of the present disclosure provide a solution to this problem, among others, using a system that continually monitors the activities of fixed pass-through configurations of workspaces to detect potential security breaches, such that when they are found, an affected hardware device may be quarantined until proper remediation techniques are employed to alleviate the security breach.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

Many IHS designs have been implemented with various types of system buses to enhance their functionality and extensibility. In general, a system bus provides an electrical interconnection scheme for connecting the hardware devices of an IHS, often using one or more expansion slots. The system bus combines the functions of a data bus to convey information, an address bus to determine where it should be sent, and a control bus to determine how the information is handled. Examples of such system buses may include those conforming to a Peripheral Component Interconnect (PCI) standard, a Peripheral Component Interconnect Express PCIe standard, or an accelerated graphics port (AGP) standard. Examples of hardware devices that may use these system buses include graphics processing cards, network interface cards, input/output (I/O) (e.g., USB) expansion port cards, Wi-Fi interface cards, storage controller cards, and the like.

These system buses have provided a relatively efficient technique for modifying or enhancing the functionality of an IHS by enabling the hardware devices to be easily added to, and removed from the IHS. Many of these hardware devices are provided with their own computer executable environment capable of performing certain algorithms. These algorithms, however, may include harmful (either malicious or inadvertent) algorithms that can damage or hinder the operation the IHS if not managed properly.

A fixed pass-through feature, which is now commonly available with many virtualized environments (e.g., workspace orchestration systems), has engendered certain security vulnerabilities. One example of such a fixed pass-through feature is a PCIe pass-through that may be utilized with PCIe system buses. A virtualized environment may include a hypervisor or virtual machine manager (VMM) that can instantiate multiple instances of virtual machines (VMs) (e.g., guest operating systems (OSs)) on the same "bare-metal" IHS. The fixed pass-through configuration allows a virtual machine (VM) instance to have direct access to a hardware device on the IHS. Direct device assignment (fixed pass-through) is such a mechanism, where the VMM assigns a device exclusively to one VM instead of sharing it with other virtual machines. While assigning a hardware device to be directly controlled by a VM improves its performance, this approach also introduces a wide range of security vulnerabilities.

Using fixed pass-through to a virtual machine often results in potential security vulnerabilities. For example, though hardware device is authenticated through certificate and firmware measurements, some flaw in the hardware device firmware or its associated driver can still make the hardware device vulnerable. The vulnerability can be triggered when buggy or malicious code, such as a device driver or a firmware is running in privileged mode on the VM (e.g., guest OS). Moreover, attackers that successfully exploit vulnerabilities in the host may also compromise the privacy and integrity of other VMs operating on the IHS. The flaw could be applicable to other device sharing modes such as SR-IOV, and the like. As will be described in detail herein below, embodiments of the present disclosure provide a solution to these problems, among others, by providing a workspace fixed pass-through monitoring system and method for hardware devices of an information handling system (IHS) using a baseboard management controller (BMC).

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 1 shows an example of an IHS 100 configured to implement a workspace-based fixed pass-through monitoring system and method for hardware devices using a baseboard management controller (BMC). In one embodiment, the IHS 100 may implement systems and methods for hardware device authentication using the BMC. Particularly, IHS 100 includes one or more processor(s) 102 coupled to system memory 104 via system bus which may include any suitable type. System memory 104 may include a plurality of software and/or firmware modules including firmware (F/W) 108, basic input/output system (BIOS) 110, operating system (O/S) 112, and/or application(s) 114. Software and/or firmware module(s) stored within system memory 104 may be loaded into processor(s) 102 and executed during operation of IHS 100.

F/W 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or a SMBIOS interface 142 for accessing as well as updating the BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of a IHS 100. This feature can eliminate the need for the operating system to probe hardware directly to discover what devices are present in the computer.

IHS 100 includes one or more input/output (I/O) controllers 118 which manages the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), which may be included or coupled to IHS 100.

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

IHS 100 further includes one or more power supply units (PSUs) 130. PSUs 130 are coupled to a BMC 132 via an I²C bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, PSUs 130, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. Management operations may be performed by BMC 132 even if IHS 100 is powered off, or powered down to a standby state. BMC 132 may include a processor, memory, and an out-of-band network interface separate from and physically isolated from an in-band network interface of IHS 100, and/or other embedded resources.

In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC). As a non-limiting example, the BMC 132 may be an integrated Dell Remote Access Controller (iDRAC) from Dell® that is embedded within a Dell PowerEdge™ server to provide functionality that helps information technology (IT) administrators deploy, update, monitor, and maintain servers remotely.

Figure 2:
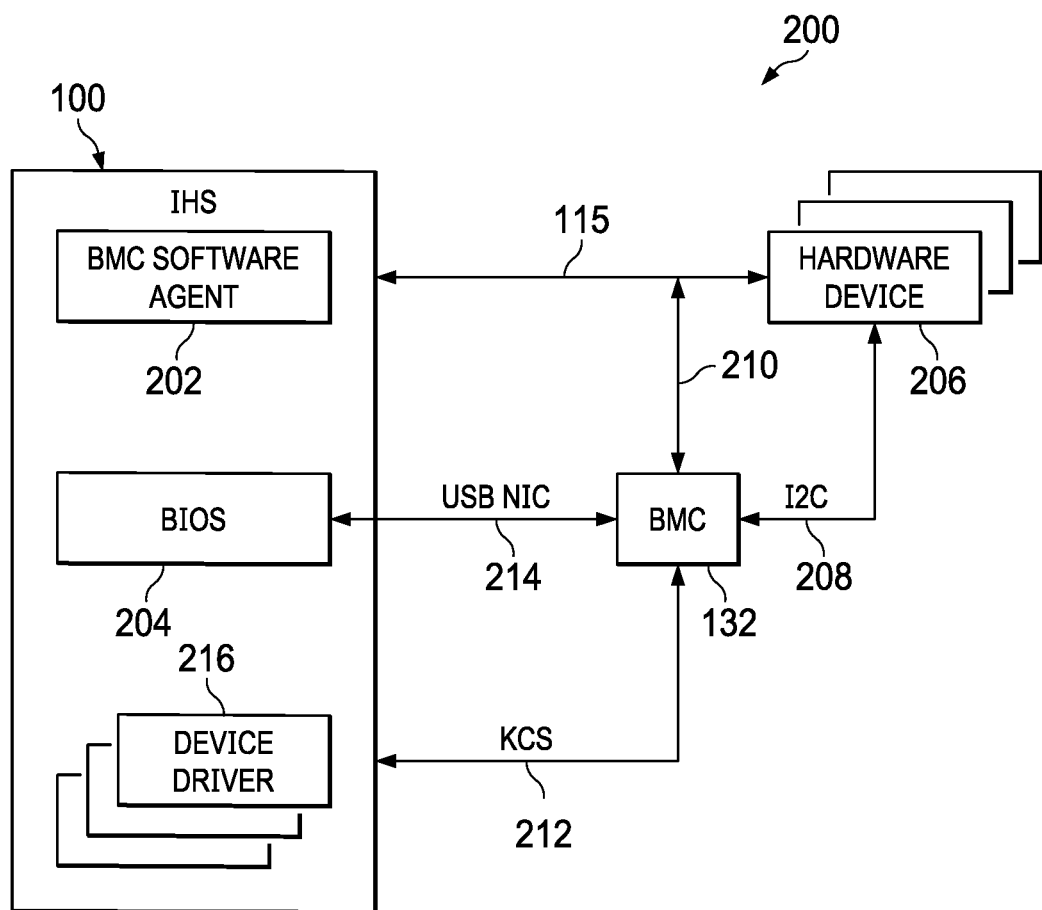
FIG. 2 is a diagram illustrating several components of an example BMC along with those of an associated IHS showing how those components may signal one another for implementing the BMC-based hardware device authentication system according to one embodiment of the present disclosure.

FIG. 2 is a diagram 200 illustrating several components of an example BMC 132 along with those of an associated IHS 100 showing how those components may signal one another for implementing the BMC-based hardware device authentication system according to one embodiment of the present disclosure. The IHS 100 is shown with a BMC software agent 202 and a basic input output system (BIOS) 204, and one or more device drivers 216 that are each associated with one of the hardware devices 206. The IHS 100 also includes one or more hardware devices 206, such as graphics processing cards, network interface cards, input/output (I/O) (e.g., USB) expansion port cards, Wi-Fi interface cards, storage controller cards, and the like. For example, the hardware devices 206 may be an I/O controller 118, a NID 122, or a storage controller configured to manage the non-volatile storage 134, such as described herein above. Each hardware device 206 communicates with the IHS 100 via system bus 106. In one embodiment, system bus 106 may include a Peripheral Component Interconnect Express (PCIe) bus.

According to certain embodiments of the present disclosure, the hardware device 206 may comprise any removable device that communicates using the Security Protocol and Data Model (SPDM) protocol. Within this disclosure, a removable device may be any type that can be added to or removed from the IHS 100. In some cases, the hardware device 206 can be hot-plugged into the IHS 100. That is, the hardware device 206 can be added to, or removed from the IHS 100 while it is running.

The BMC 132 communicates with each of multiple hardware devices 206 via an i2c connection 208 such as described above. In other embodiments, the BMC 132 may communicate with each of the hardware devices 206 using other communication protocol, such as i3c SENSEWIRE connections, or serial peripheral interface (SPI) based connections. Additionally, the BMC 132 may also communicate with each of the hardware devices 206 through the system bus 106 using a Management Component Transport Protocol (MCTP) PCIe vendor defined message (VDM) channel 210.

The BMC 132 may also communicate with the IHS 100 through the PCIe VDM channel 210, a Keyboard Controller Style (KCS) channel 212, and/or a USB NIC channel 214. The KCS channel 212 is provided as part of an intelligent platform management interface (IPMI) specification. In general, the IPMI specification defines several system interfaces for local access from the BMC software agent 202 and BIOS 204 to the BMC 132 of which the KCS protocol provides an ideal connection that does not require authentication for its operation.

The BMC software agent 202 is a lightweight software service that is executed on the host IHS 100 to integrate certain operating system (OS) features with the BMC 132. The BMC software agent 202 provides OS-related information to the BMC 132, and may add capabilities such as LC log event replication into the OS log, WMI support (including storage), iDRAC SNMP alerts via OS, iDRAC hard reset and remote full Power Cycle. For example, the BMC software agent 202 may be an iDRAC Service Module (iSM) that is configured to operate with the integrated Dell remote access controller (iDRAC), which are both provided by the DELL CORPORATION.

As described above, some hardware devices, which can be physically added to and removed from IHSs can cause certain security threats if not handled properly. Many of these hardware devices are provided with their own computer executable environment capable of executing certain algorithms for providing their respective services. These algorithms, however, may include harmful (either malicious or inadvertent) code that can damage or hamper the operation the IHS. The hardware device authentication system uses an authentication scheme for safely entering the hardware devices into service for their IHSs while eliminating or reducing any potential security breaches that could be caused thereby.

During booting of the BMC 132, the hardware devices 206 are authenticated and a secure channel is established. Once authenticated, the hardware devices 206 can be trusted and I/O operations can be performed by the IHS 100. Nevertheless, certain hardware devices 206 may be hot plug capable (e.g., inserted while the IHS is running), thus yielding a security leak in which malicious code running on the hardware device may be able to access the system bus 106. Additionally, OS resource allocation and utilization by certain hardware devices 206 may start earlier then the BMC 132 (e.g., DELL's iDRAC) has a chance to authenticate the device using its sideband interface. As will be described in detail herein below, embodiments of the present disclosure cause the BIOS 204 power on self-test (POST) procedure to wait until some, most, or all hardware devices 206 are authenticated prior to allowing the POST procedure to complete.

Although FIG. 2 describes one example of an architecture that may be configured to provide a hardware device authentication system, the features of the disclosed architecture may be embodied in other specific forms without deviating from the spirit and scope of the present disclosure. For example, the IHS/BMC architecture as shown may include additional, fewer, or different components than those operations as described in the present example. As another example, while the IHS 100 is shown with those components described above for purposes of brevity and clarity of discussion, it should be appreciated that IHS 100 may be configured with additional, fewer, or different components without departing from the spirit and scope of the present disclosure.

Figure 3:
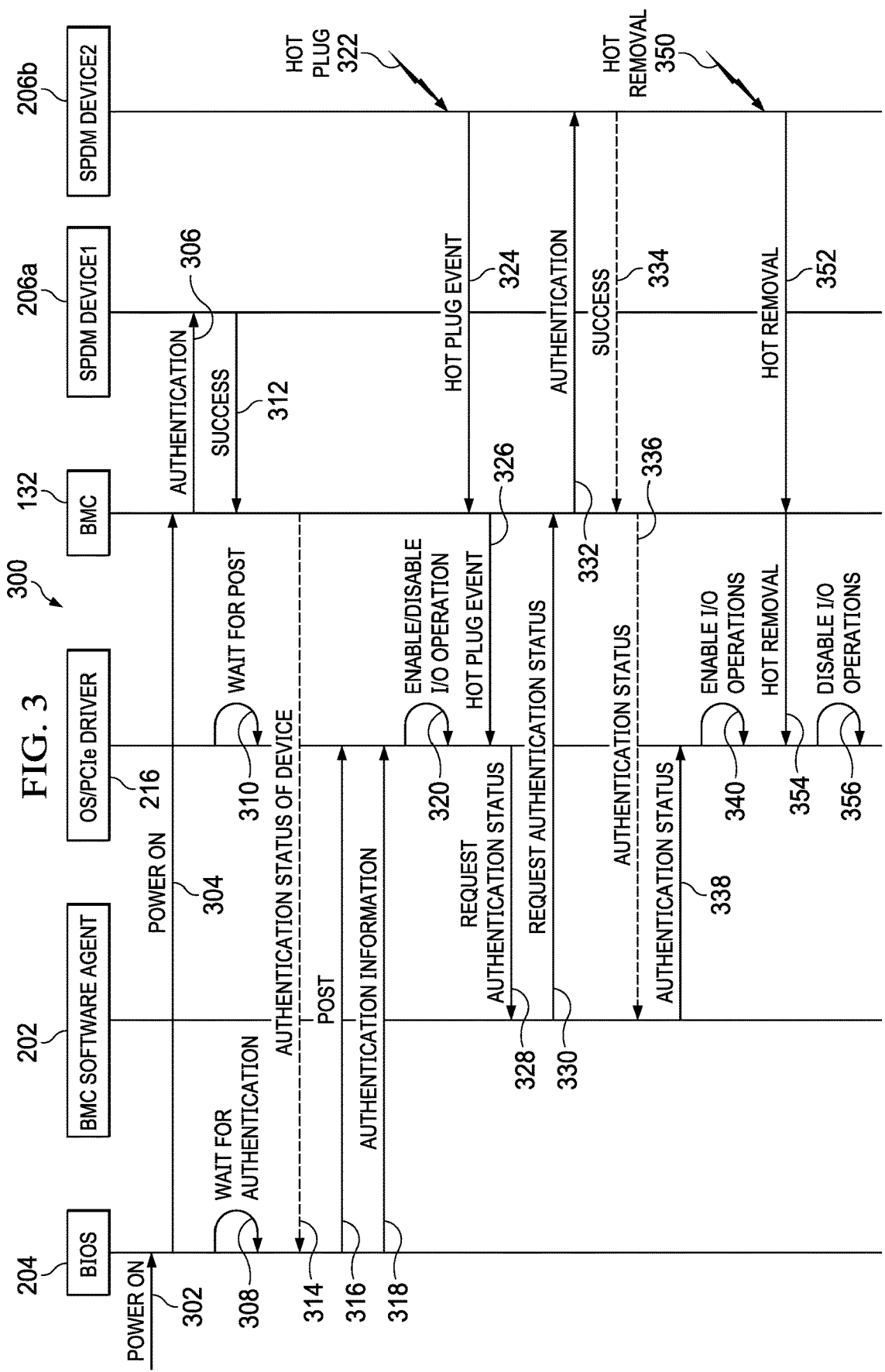
FIG. 3 is a workflow diagram describing certain steps of one embodiment of a hardware device authentication method according to one embodiment of the present disclosure.

FIG. 3 is a workflow diagram describing certain steps of one embodiment of a hardware device authentication method 300 according to one embodiment of the present disclosure. As will be described in detail herein below, the method 300 may be provided for authenticating hardware devices 206 prior to allowing them to access the processes (e.g., I/O operations) of the host IHS 100. Initially, the IHS 100 is configured with a BMC 132 and a hardware device 206a that is capable of communicating using the SPDM protocol. Although only two hardware devices 206a, 206b are shown and described in the method 300, it should be understood that the method 300 can be practiced with any quantity of hardware devices 206, such as three or more SPDM enabled hardware devices 206.

At step 302, the IHS 100 is powered on. The IHS 100 may be powered on manually by a user, or remotely, such as a remote command received through the BMC 132. At step 304, the BIOS 204 issues a power ON signal to the BMC 132, which in turn, causes the BMC 132 to commence its authentication procedure with each of the hardware devices 206a in the IHS 100 at step 306.

Immediately after sending the power ON signal to the BMC 132, the BIOS 204 waits for authentication by the BMC 132 for each hardware device 206a at step 308. That is, the BIOS 204 may concurrently perform its POST in the normal manner, but is not allowed to issue the POST complete message until it receives an authentication complete message from the BMC 132. Additionally, the device driver 216 associated with the hardware device 206a waits for the POST complete message prior to commencing its operation at step 310.

At some point in time when the authentication procedure started for the hardware device 206a at step 306 is completed, the hardware device 206a issues a success message to the BMC 132 at step 312. For example, the success message issued by the hardware device 206a may include a response message to a challenge message included in the message at step 306. In one embodiment, the authentication procedure may be conducted according to the SPDM protocol. Additionally, although the method 300 only describes the authentication of one hardware device 206a, it should be appreciated that the authentication procedure may be performed for each of multiple hardware devices 206a configured in the IHS 100.

At step 312, after the BMC 132 has performed the authentication procedure for the hardware device 206a, it transmits the authentication status of the hardware device 206a to the BIOS 204 at step 314. Thereafter at steps 316 and 318, the BIOS 204 issues the POST complete message to the device driver 216 along with its associated hardware device 206a authentication status, respectively. In response, the device driver 216 either inhibits or allows operation of its respective hardware device 204 based upon the authentication status at step 320. That is, if a particular device driver 216 receives a successful authentication status, it would then enable its associated hardware device 206a for operation with the IHS 100. On the other hand, if a particular device driver 216 receives a failed authentication status, it would then inhibit its associated hardware device 206a from operation with the IHS 100. In one embodiment, the BIOS 204 and/or other entity, such as the system bus controller may inhibit operation of any unused slots. This action may be particularly useful in cases where a hardware device 206a is hot-plugged into the unused slot in which operation of the hot-plugged hardware device 206a may be authenticated prior to being allowed to access the services of the host IHS 100. Such may be the case as described below with reference to steps 322 through 340.

At step 322, another hardware device 206b is hot-plugged into a slot of the IHS 100. While the hardware device 206b is being described herein as being hot-plugged into a slot, it should be understood that the device may be any mechanism or connector that allows the hardware device 206b to be interconnected to the IHS 100. Furthermore, it is contemplated that, rather than a slot, the hardware device 206b may be interconnected to the IHS 100 using a wireless connection, such as Bluetooth connection, that interconnects a SPDM capable hardware device 206b to the IHS 100. The BMC 132 is then notified of the hot-plug event at step 324, and forwards the notification to the device driver 216 associated with that hardware device 206b at step 326. At step 328, the device driver 216 then sends an authentication status request to the BMC software agent 202, which in turn, forwards the authentication request to the BMC 132 at step 330.

At step 332, the BMC 132 commences its authentication procedure with the hardware device 206b. At some point in time when the authentication procedure is completed, the hardware device 206b issues a success message to the BMC 132 at step 334. The success message may be, for example, a successful response message to a previous challenge message presented by the BMC 132 at step 332. Thereafter, the BMC 132 sends the authentication status to the BMC software agent 202 at step 336, which in turn, forwards the authentication status to the device driver 216 associated with that hardware device 206b at step 338. In response, the device driver 216 either inhibits or allows operation of its respective hardware device 206b based upon the authentication status at step 340. That is, if a particular device driver 216 receives a successful authentication status, it would then enable its associated hardware device 206a for operation with the IHS 100; otherwise, it inhibits its associated hardware device 206b from operation with the IHS 100.

Steps 350 through 356, generally describe a sequence of actions that may be performed to disable operation (e.g., removal) of a slot or other interconnection mechanism when the hardware device 206b is hot removed from the IHS 100. Within this disclosure, hot removal generally refers to the act of removing the hardware device 206b while the IHS 100 is currently running. At step 350, the hardware device 206b is hot removed from the IHS 100. The BMC 132 is notified of this event at step 352, and in turn, sends a hot removal message to the device driver 216 associated with the hardware device 206b at step 354. Throughout this disclosure, the terms 'signal' and 'message' may be used interchangeably to mean any informational technique that is transmitted from one component of the system to another. When the device driver 216 receives the hot removal message, it disables operation of the slot at step 356.

As can be clearly seen from the description above, the BIOS POST procedure waits for the authentication complete message from the BMC 132. Additionally, the BMC 132 authenticates some, most, or all the SPDM capable hardware devices 206 and passes the authentication information to the BIOS 204 via IPMI command over a suitable interface, such as a KCS interface or a memory block shared between the BMC 132 and BIOS 204. The authentication status is then made available to the device driver 216. The device driver 216 can then enable and/or disable the I/O operations for the slot. When the hardware device 206 is hot plugged, the device driver 216 can request the authentication status from BMC software agent 202. The BMC software agent 202 may in turn, request the authentication status from the BMC 132. Once the authentication credentials are verified successfully, the BMC software agent 202 may then pass the information to the device driver 216. The device driver 216 may then enable or disable the functionality (e.g., I/O operations) of the hardware device 206 based on the authentication status. When the hardware device 206 is removed, the device driver 216 shall disable the I/O operation for the slot. Nevertheless, when use of the workspace migration method 300 is no longer needed or desired, the process ends.

Although FIG. 3 describes an example method that may be performed for managing event messages, the features of the method 300 may be embodied in other specific forms without deviating from the spirit and scope of the present disclosure. For example, the method 300 may perform additional, fewer, or different operations than those described in the present examples. As another example, certain steps of the method 300 may be performed by other components in the IHS 100 other than those described above.

Figure 4:
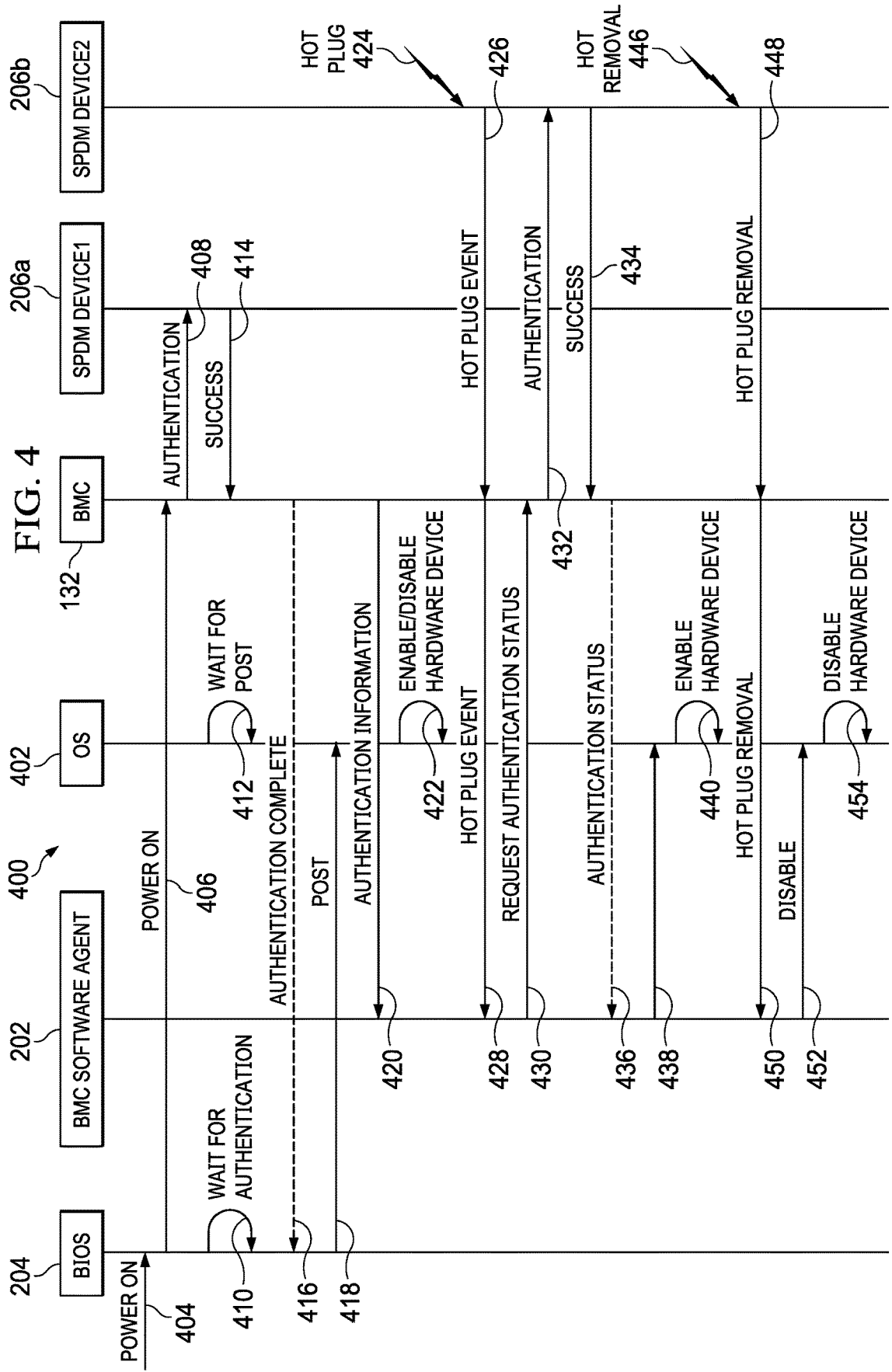
FIG. 4 is a workflow diagram describing certain steps of another embodiment of a hardware device authentication method according to one embodiment of the present disclosure.

FIG. 4 is a workflow diagram describing certain steps of another embodiment of a hardware device authentication method 400 according to one embodiment of the present disclosure. As will be described in detail herein below, the method 400 may be provided for authenticating hardware devices 206 prior to allowing them to function, such as performing I/O operations with the host IHS 100. Initially, the IHS 100 is configured with a BMC 132 and a hardware device 206a that is capable of communicating using the SPDM protocol. Although only two hardware devices 206a, 206b are shown and described in the method 400, it should be understood that the method 400 can be practiced with any quantity of hardware devices 206, such as three or more SPDM enabled hardware devices 206.

At step 404, the IHS 100 is powered on. The IHS 100 may be powered on manually by a user, or remotely, such as a remote command received through the BMC 132. At step 406, the BIOS 204 issues a power ON signal to the BMC 132, which in turn, causes the BMC 132 to commence its authentication procedure with the hardware device 206a in the IHS 100 at step 408.

Immediately after sending the power ON signal to the BMC 132, the BIOS 204 waits for authentication by the BMC 132 for the hardware device 206a at step 410. In other embodiments in which the IHS 100 includes multiple hardware devices, the BIOS 204 may wait until the authentication for all the hardware devices are complete. That is, the BIOS 204 may concurrently perform its POST in the normal manner, but is not allowed to issue the POST complete message until it receives an authentication complete message from the BMC 132. Additionally, the operating system 402 of the IHS 100 waits for the POST complete message prior to commencing its operation at step 412.

At some point in time when the authentication procedure started for the hardware device 206a at step 408 is completed, the hardware device 206a issues a success message to the BMC 132 at step 414. For example, the success message issued by the hardware device 206a may include a response message to a challenge message included in the message at step 408. In one embodiment, the authentication procedure may be conducted according to the SPDM protocol.

Although the method 400 only describes the authentication of one hardware device 206a, it should be appreciated that the authentication procedure may be performed for each of multiple hardware devices 206a configured in the IHS 100. Additionally in certain embodiments, a subset of all the SPDM capable hardware devices 206a may be designated to perform an authentication procedure with the BMC 132. For example, the BIOS 204 may store information for enforcing the authentication procedure for those hardware devices 206a that are provided by a certain vendor. As another example, the BIOS 204 may store information for not requiring certain hardware devices 206a to undergo the authentication procedure, such as those hardware devices 206 having a level of trust such that authentication is not warranted. Yet another example, the BIOS 204 may store information about those hardware devices 206 that have recently been upgraded with new firmware, and enforce the authentication procedure for only those hardware devices 206 that have recently been upgraded.

At step 414, after the BMC 132 has performed the authentication procedure for the hardware device 206a in the IHS 100, it transmits the authentication status of the hardware device 206a to the BIOS 204 at step 416. Thereafter at steps 418, the BIOS 204 issues the POST complete message to the operating system 402 along with its associated hardware device 206a authentication status. In response, the operating system 402 either inhibits or allows operation of its respective hardware device 206a based upon the authentication status at step 422. That is, if a particular operating system 402 receives a successful authentication status, it would then enable its associated hardware device 206a for operation with the IHS 100. On the other hand, if the operating system 402 receives a failed authentication status, it would then inhibit its associated hardware device 206a from operation with the IHS 100.

Additionally, the BMC 132 sends the authentication status information to the BMC software agent 202 at step 420. This action may be particularly useful in cases where a hardware device 206a is hot-plugged into the unused slot in which operation of the hot-plugged hardware device 206a may be authenticated by the BMC software agent 202, thus alleviating any intervention that would otherwise be required by the BIOS 204 and/or operating system 402. Such may be the case as described below with reference to steps 424 through 440.

At step 424, another hardware device 206b is hot-plugged into a slot of the IHS 100. The BMC 132 is then notified of the hot-plug event at step 426, and forwards the notification to the BMC software agent 202 at step 428. At step 430, the BMC software agent 202 then sends an authentication status request to the BMC 132, which in turn, commences an authentication procedure with the newly connected hardware device 206b at step 432. At some point in time when the authentication procedure is completed, the hardware device 206b issues a success message to the BMC 132 at step 434. The success message may be, for example, a successful response message to a previous challenge message presented by the BMC 132 at step 432.

Thereafter, the BMC 132 sends the authentication status to the BMC software agent 202 at step 436, which in turn, forwards the authentication status to the operating system 402 at step 438. In response, the operating system 402 either inhibits or allows operation of the hardware device 206b based upon the authentication status at step 440. That is, if the operating system 402 receives a successful authentication status, it would then enable its associated hardware device 206b for operation with the IHS 100; otherwise, it inhibits the hardware device 206b from operation with the IHS 100.

Steps 446 through 454, generally describe a sequence of actions that may be performed to disable operation of a slot or other interconnection mechanism when the hardware device 206b is hot removed from the IHS 100. At step 446, the hardware device 206b is hot removed from the IHS 100. The BMC 132 is notified of this event at step 448, and in turn, sends a hot removal message to the BMC software agent 202 at step 450. Thereafter at step 452, the BMC software agent 202 notifies the operating system 402 of the hot removal action, such that the operating system 402 can disable the slot at step 454.

As can be clearly seen from the description above, the BIOS POST procedure waits for the authentication complete message from the BMC 132. Additionally, the BMC 132 authenticates some, most, or all the SPDM capable hardware devices 206 and informs the BIOS 204, which waits until it receives the message to issue a POST complete message to the IHS 100. Upon POST complete, the BMC 132 passes the authentication information to BMC software agent 202. Based on the authentication status, the BMC software agent 202 disables the device driver 216 for the slot of any un-authenticated hardware device 206 in addition to any empty slots. Additionally, the BMC software agent 202 may receive hot plug events from BMC 132, and it may disable/enable the driver for the slot based on the SPDM authentication status received from BMC 132. The BMC software agent 202 may disable the device driver 216 for the slot upon receiving hot removal notification from the BMC 132. Additionally, the BMC software agent 202 may shall enable/disable the slots if the host operating system 402 supports such functionality. Nevertheless, when use of the workspace migration method 400 is no longer needed or desired, the process ends.

Although FIG. 4 describes an example method that may be performed for managing event messages, the features of the method 400 may be embodied in other specific forms without deviating from the spirit and scope of the present disclosure. For example, the method 400 may perform additional, fewer, or different operations than those described in the present examples. As another example, certain steps of the method 400 may be performed by other components in the IHS 100 other than those described above.

Figure 5:
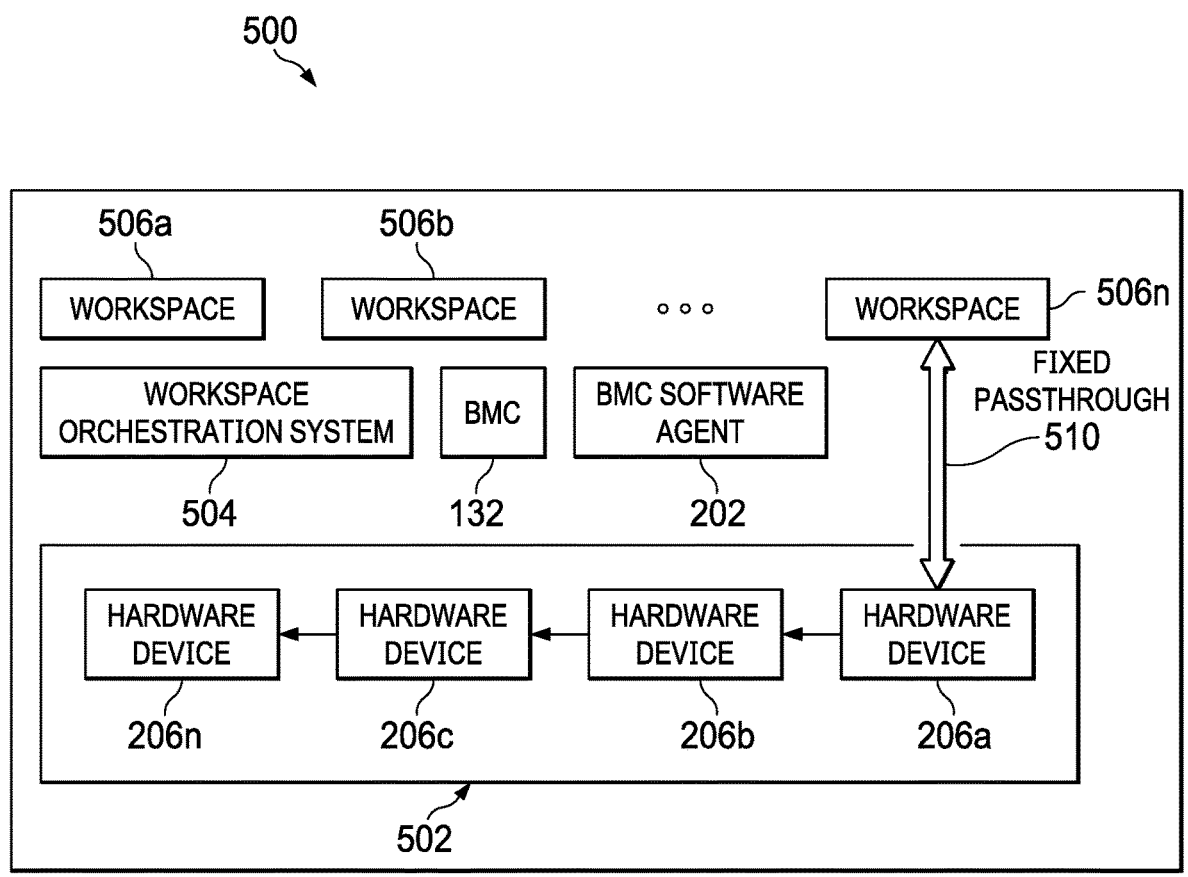
FIG. 5 illustrates an example IHS that may use a SPDM-based trusted network to remediate security vulnerabilities caused by fixed pass-through configured in a virtualized environment according to one embodiment of the present disclosure.

FIG. 5 illustrates an example IHS 500 that may use a SPDM-based trusted network 502 to remediate security vulnerabilities caused by fixed pass-through configured in a virtualized environment according to one embodiment of the present disclosure. The SPDM-based trusted network 502 may be one in which the hardware devices 206 A-N (or individually referred to as hardware device 206) have been authenticated using the BMC-based hardware device authentication system and method as described above with reference to FIGS. 1-4. The hardware devices 206 A-N may be any SPDM-enabled device. For example, hardware device 206A may be a graphics processor, hardware device 206B may be a network controller, hardware device 206C may be a storage controller, and 206N may be a USB expansion card. The IHS 500 is also configured with a virtualized environment including a workspace orchestration service (hypervisor) 504 that can instantiate multiple workspaces (e.g., virtual machines (VMs)) 506 A-N (or individually referred to as VM 506). As shown in the present embodiment, workspace orchestration service 504 has configured workspace 506N to have a fixed pass-through configuration 510 with the graphics controller 206A. While the present embodiment describes a fixed pass-through configuration 510 that is configured on a graphics processor hardware device 206A, it should be understood that the teachings of the present disclosure may be applied to other hardware devices 206 B-N without departing from the spirit and scope of the present disclosure.

The BMC 132 includes executable code for continual monitoring one or more operating characteristics of any hardware devices 206 A-N that are operating in a fixed pass-through configuration 510 with a workspace 506 A-N such that when it determines that the operating characteristics are indicative of a security breach of the fixed pass-through configuration 510, it may perform one or more operations to quarantine the one hardware device 206 A-N. The operating characteristics may be any type that may be indicative of a security breach of the fixed pass-through configuration 510. Examples of such operational characteristics may include input/output I/O device faults, correctable errors, uncorrectable errors, improper memory access requests, and the like.

Quarantining the hardware device 206A may be useful to ensure that security breaches existing on the hardware device 206A are not propagated to other hardware devices 206 A-N in the SPDM-based trusted network 502. For example, once the graphics processor hardware device 206A is compromised, it may be loaded with malicious code that can be executed to corrupt the NID hardware device 206B, which can in turn, be loaded with additional malicious code to corrupt the storage controller hardware device 206C and so on. Thus, by quarantining the hardware device 206 that is affected by the corrupted fixed pass-through configuration 510, other hardware devices 206 in the IHS 100 may be secured from any malicious security breaches.

The BMC 132 may perform any suitable type of operation to quarantine the affected hardware device 206A. In one embodiment, the I/O operations of the hardware device 206 may be disabled (e.g., removed), such as described above with reference to step 356 of FIG. 3 or step 454 of FIG. 4. In another embodiment, the BMC 132 may communicate with the BMC software agent 202, that in turn, communicates with the workspace orchestration system 504 (e.g., via a vmkdevmgr device) to initiate a device detach operation from PCIe layer. In yet another embodiment, the BMC 132 may communicate with the BMC software agent 202, that in turn, communicates with the ACPI layer of the IHS 500 to initiate an ACPI_OSC method to turn off the hardware device 206 by setting its appropriate ACPI device state (e.g., D3 cold).

The workspace orchestration system 504, which may also be referred to as a hypervisor or virtual machine manager (VMM), is capable of instantiating multiple instances of workspaces 506a-n (e.g., guest operating systems (OSs)) on the IHS 500. Many currently available workspace orchestration systems 502 provide a fixed pass-through feature. This fixed pass-through feature, however, causes certain security vulnerabilities. One example of such a fixed pass-through feature is a PCIe pass-through that may be utilized with PCIe system buses. While assigning a hardware device to be directly controlled by a VM improves its performance, this approach also introduces a wide range of security vulnerabilities such as described above. Accordingly, the BMC 132 is configured to quarantine hardware devices 206 with fixed passthroughs that exhibit security breaches so that the rest of the hardware devices 206 may be protected according to embodiments of the present disclosure.

Figure 6:
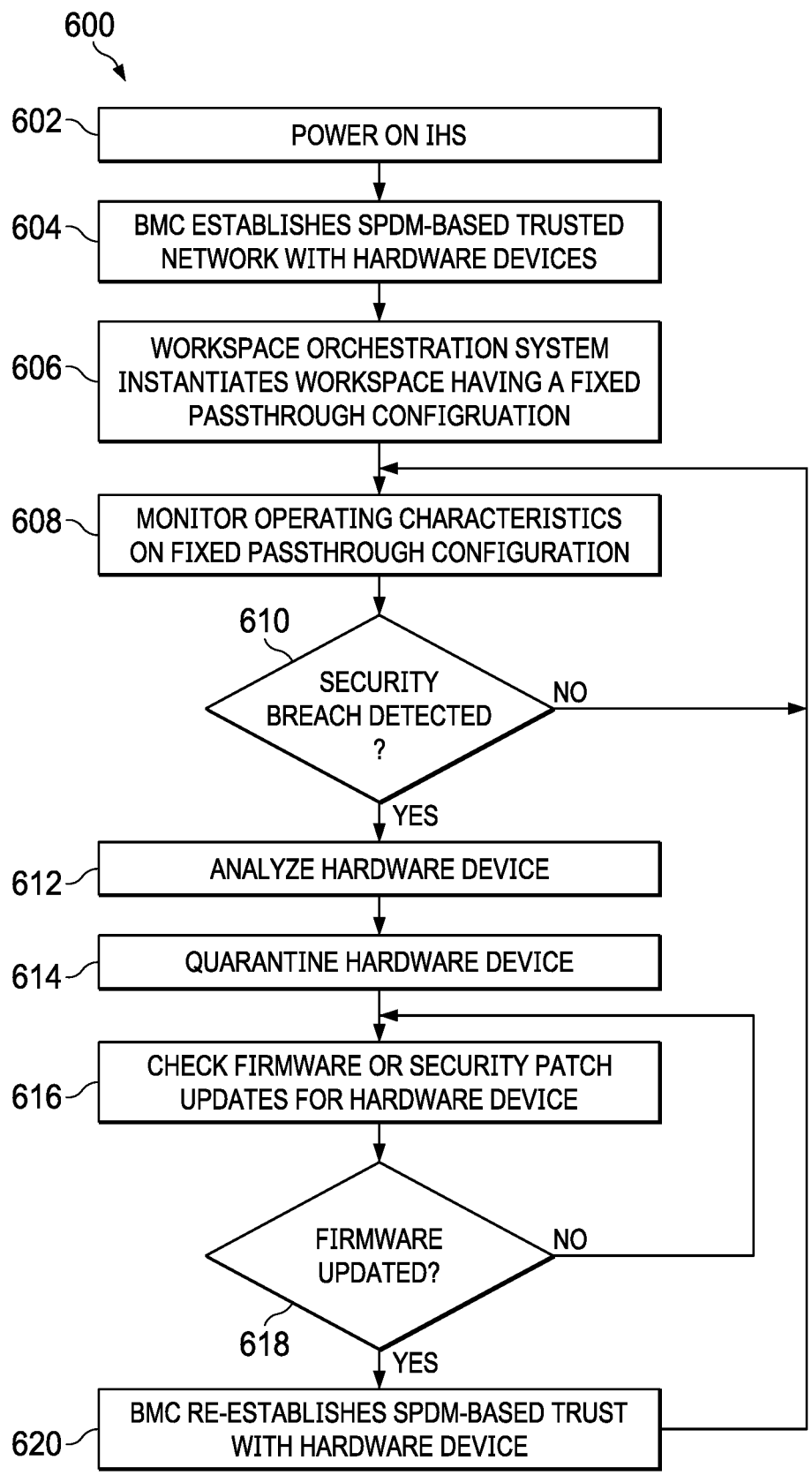
FIG. 6 illustrates an example fixed pass-through monitoring method for hardware devices of an information handling system (IHS) using a baseboard management controller (BMC) according to one embodiment of the present disclosure.

FIG. 6 illustrates an example fixed pass-through monitoring method 600 for hardware devices of an information handling system (IHS) using a baseboard management controller (BMC) according to one embodiment of the present disclosure. As will be described in detail herein below, the method 600 may be provided for continual monitoring of one or more operating characteristics of a hardware device 206 with a fixed pass-through configuration such that, when the operational characteristics exhibit a security breach, the hardware device 206 may be quarantined to protect the rest of the hardware devices 206 in the IHS 100. The method 600 may be performed in whole, or at least in part by either the BMC 132, the BMC software agent 202, or a combination thereof. Initially, the IHS 100 is configured with multiple SPDM enabled hardware devices 206 A-N.

At step 602, the IHS is powered on. Thereafter at step 604, the BMC 132 establishes a SPDM-based trusted network 502 with the hardware devices 206 a-n. For example, the steps as described above with reference to FIG. 3 or 4 may be performed with each hardware device 206 so that it may be added to the SPDM-based trusted network 502. The workspace orchestration system 504 then instantiates a workspace 506 that has a fixed pass-through configuration 510. In one embodiment, the fixed pass-through configuration 510 comprises a PCIe fixed pass-through configuration at step 606.

While the workspace 506 is being executed, the method 600 continually monitors certain operating characteristics of fixed pass-through configuration at step 608. The method 600 may monitor any operational characteristics that may be indicative of a security breach through the fixed pass-through configuration 510. Additional details of certain operational characteristics that may be monitored by the BMC 132 and/or BMC software agent 202 will be described in detail herein below.

At step 610, The method 600 determines that a security breach is detected. In one embodiment, the method 600 may make the determination based on one or more policies. For example, the method 600 may determine that a security breach exists when a certain operational characteristics event occurs once. As another example, the method 600 may determine that a security breach exists when a certain operational characteristics event occurs a specified quantity of times over a certain elapsed period of time. For yet another example, the method 600 may determine that a security breach exists when a certain pattern of operational characteristics events occur, such as a certain sequence of operational characteristics events. For yet another example, the method 600 may determine that a security breach exists when a machine learning (ML) process indicates that a certain pattern of operational characteristics events may be indicative of a security breach. Nevertheless, if the method 600 determines whether or not a security breach is detected, processing continues at step 612; otherwise, processing continues at step 608 to continually monitor the operational characteristics of the fixed pass-through configuration 510.

At step 612, the method 600 analyzes the affected hardware device 206. For example, the BMC software agent 202 may analyze a memory dump of the affected hardware device 206 to identify any specific root causes of the security breach, and transmit information associated with the analysis to the BMC 132, which in turn, may send the information to an administrator computer in the form of an asynchronous event notification (AEN).

At step 614, the method 600 quarantines the hardware device 206. Quarantining the hardware device 206 effectively protects the other hardware devices 206 from being adversely affected by the security breach. The hardware device 206 may be quarantined in any suitable manner. Embodiments of various techniques for quarantining the hardware device 206 are described herein above with respect to FIG. 5 and below with respect to FIGS. 7 and 8.

At this point, the affected hardware device 206 is quarantined and is inhibited from interacting with the other hardware devices 206 in the IHS 100. Nevertheless, steps 616 through 620 describe one embodiment of how the affected hardware device 206 may be processed so that its quarantine state can be alleviated (e.g., the affected hardware device 206 can be returned to normal operating conditions).

At step 616, the method 600 checks for any available firmware or security patch updates for the affected hardware device 206. For example, the method 600 may access an online support portal for the hardware device 206 to determine whether any firmware updates are available for the affected hardware device 206 and if so, download the firmware update(s), and flash the affected hardware device 206 with the downloaded firmware update(s). After the firmware update(s) have been flashed, the hardware device 206 may be re-booted to allow the firmware update(s) to become effective.

At step 618, the method 600 determines whether or not the firmware has been updated on the affected hardware device 206. If not, processing continues at step 616 to again check for any firmware updates that may be available for the hardware device 206. If, however, the firmware has been updated, processing continues at step 620 to re-establish the SPDM-based trust with hardware device 206. For example, the steps as described above with reference to FIG. 3 or 4 may be performed with the affected hardware device 206 so that it may be added to the SPDM-based trusted network 502. When the hardware device 206 has been added to the SPDM-based trusted network 502, processing may continue at step 608 for continual monitoring of the fixed pass-through configuration 510 of the hardware device 206 as well as the fixed pass-through configuration 510 of other hardware devices 206 in the IHS 100.

The method 600 described above may be continually performed for monitoring the fixed pass-through configuration 510 of a workspace 506 as long as that workspace 506 is being executed on the IHS 100. Nevertheless, when use of the workspace migration method 300 is no longer needed or desired, the method 600 ends.

Although FIG. 6 describes an example method that may be performed for monitoring and remediating the fixed pass-through configuration 510 of a workspace 506, the features of the method 600 may be embodied in other specific forms without deviating from the spirit and scope of the present disclosure. For example, the method 600 may perform additional, fewer, or different operations than those described in the present examples. As another example, certain steps of the method 600 may be performed by other components in the IHS 100 other than those described above.

Figure 7:
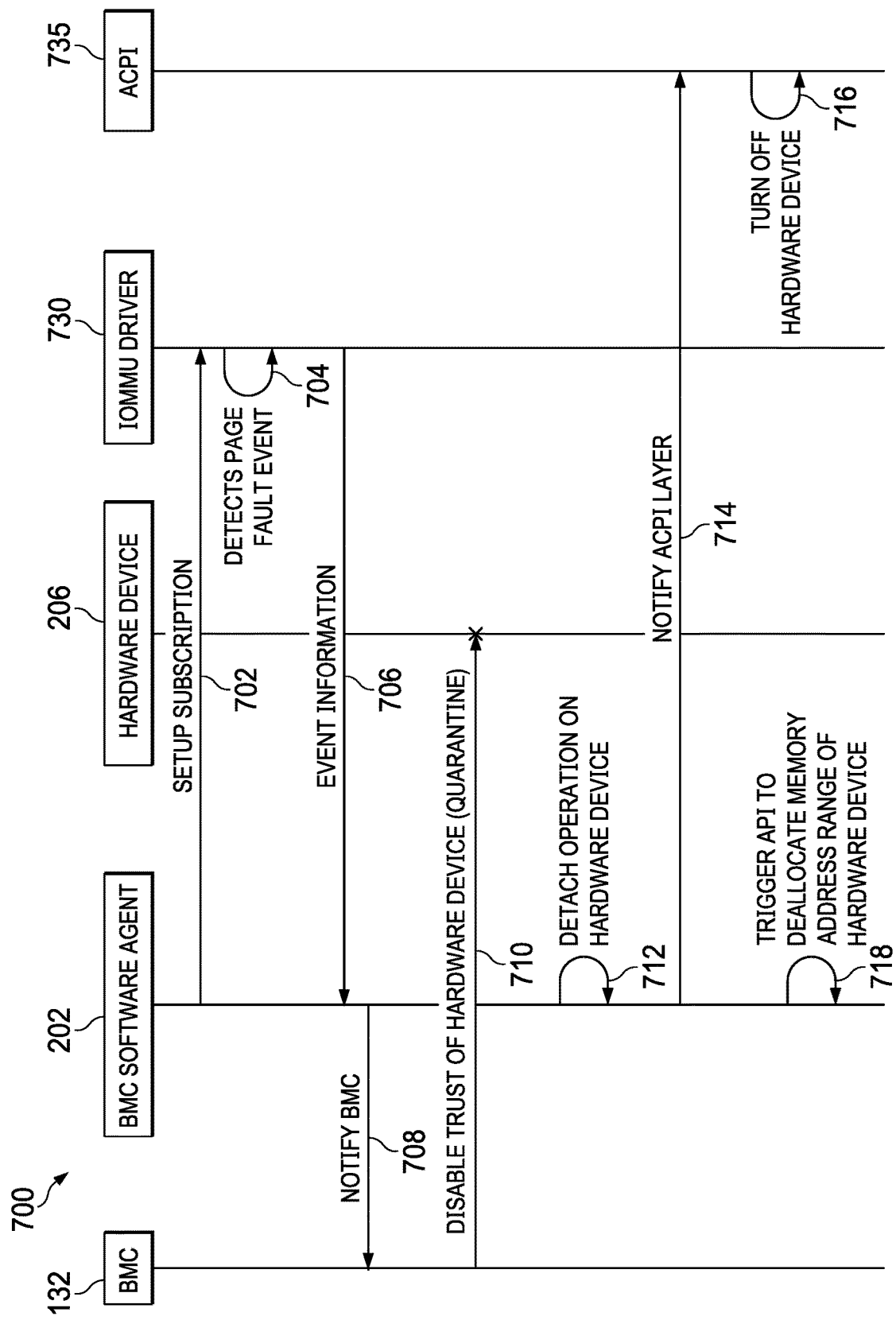
FIG. 7 is a workflow diagram describing certain steps of another fixed pass-through monitoring and security breach remediation method using a software driver associated with the processor of the IHS according to one embodiment of the present disclosure.

FIG. 7 is a workflow diagram describing certain steps of another fixed pass-through monitoring and security breach remediation method 700 using a software driver associated with the processor according to one embodiment of the present disclosure. Initially, the IHS 100 is configured with a BMC 132, a hardware device 206a that can communicate using the SPDM protocol, and a fixed pass-through driver 730, such as one provided for use with processor devices having a VT-d fixed pass-through feature provided by INTEL or an I/O management unit (IOMMU) fixed pass-through feature provided by AMD. Although only one hardware device 206 is shown and described, it should be understood that the method 700 can be practiced with any quantity of hardware devices 206, such as two or more SPDM enabled hardware devices 206.

At step 702, the BMC software agent 202 communicates with the fixed pass-through driver 730 to setup a subscription to certain operational characteristics detected by the processor associated with the fixed pass-through driver 730. For example, the BMC software agent 202 may subscribe to receive an event notification when the fixed pass-through driver 730 detects a page fault event or other suitable operational characteristics exhibited by the processor. At this point, the processor is being continually monitored to detect an operational characteristics event that may be indicative of a security breach of the fixed pass-through configuration 510. Although the present embodiment describes a page fault event as an operational characteristic that is used to determine that a security breach has occurred, it should be understood that other operational characteristics exist that may be used to determine that a security breach has occurred without departing from the spirit and scope of the present disclosure.

At step 704, the fixed pass-through driver 730 detects that a page fault event has occurred. As such, the fixed pass-through driver 730 sends an event notification to the BMC software agent 202 in accordance with one or more rules of the subscription established at step 702. The BMC software agent 202 then forwards the event notification to the BMC 132 at step 708. In response, the BMC 132 disables the trust (quarantines) of the hardware device 206 (e.g., removes the hardware device 206 from the SPDM-based trusted network) at step 710. For example, the I/O operations of the hardware device 206 may be disabled, such as described above with reference to step 356 of FIG. 3 or step 454 of FIG. 4. It may be important to note that the fixed pass-through driver 730 is configured to notify the BMC software agent 202 rather than what is conventionally performed by invoking an assert flag on the workspace orchestration system 504 and/or the operating system of the IHS 500. Additionally, the BMC software agent 202 further quarantines the hardware device 206 by detaching operation of the hardware device 206 from the system at step 712. For example, the BMC software agent 202 may invoke a PCIe 'disable ioctl' command or a PCIe device driver detach operation against the specific device to stop its I/O and detach the device from the device layer.

At step 714, the BMC software agent 202 may quarantine the hardware device 206 by sending a notification message to the ACPI layer 735 of the IHS 500, which causes the ACPI layer 735 to turn the hardware device 206 off at step 716. The BMC software agent 202 may also quarantine the hardware device 206 by triggering an API to de-allocate the memory address range used by the hardware device 206 at step 718. Such a procedure may be at least somewhat similar to a memory page retire feature that is used to ensure that the memory page is not used by other processes in the IHS 500.

Figure 8:
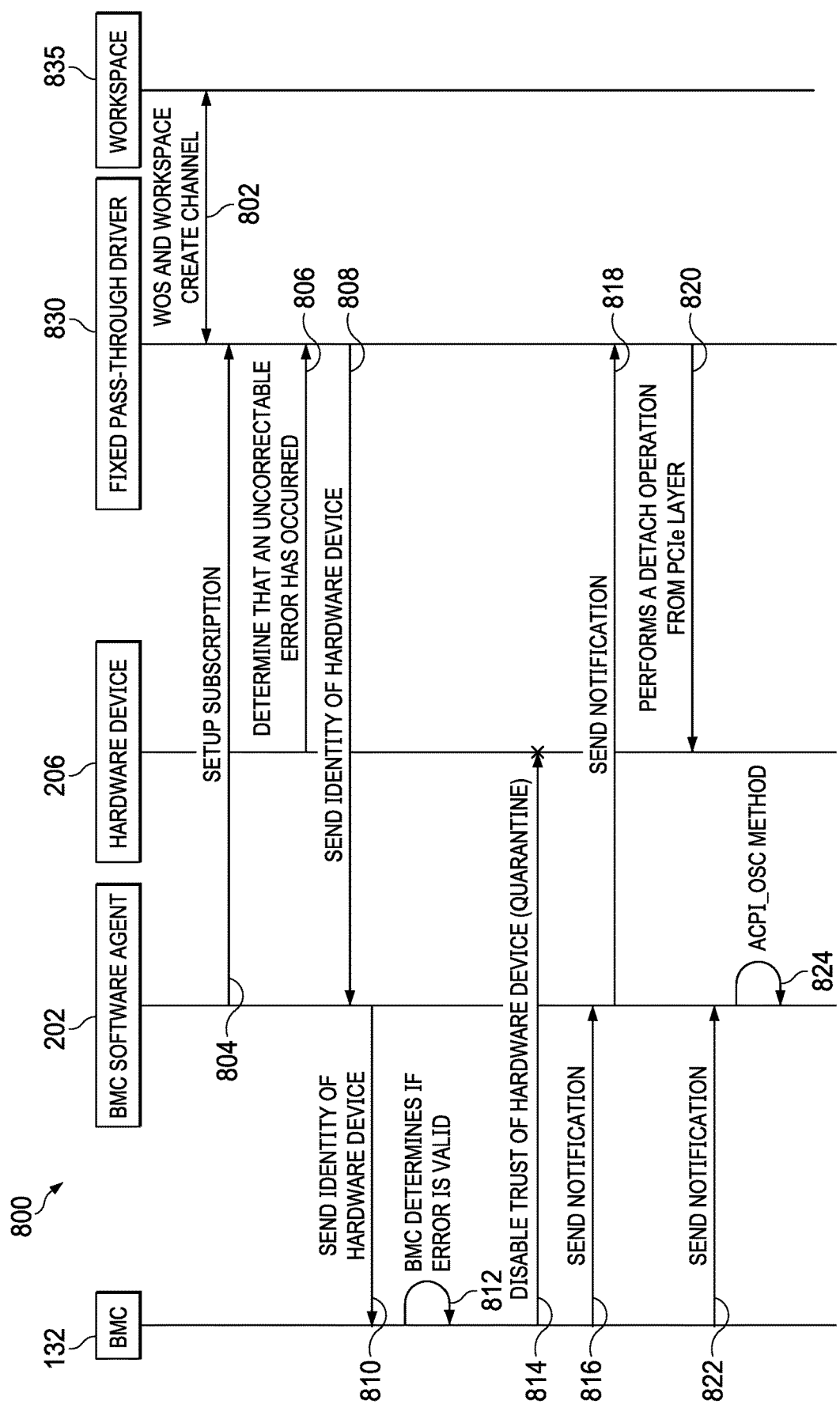
FIG. 8 is a workflow diagram describing certain steps of yet another fixed pass-through monitoring and security breach remediation method by monitoring uncorrectable errors of the fixed pass-through configuration according to one embodiment of the present disclosure

FIG. 8 is a workflow diagram describing certain steps of yet another fixed pass-through monitoring and security breach remediation method 800 by monitoring uncorrectable errors of the fixed pass-through configuration according to one embodiment of the present disclosure. Initially, the IHS 100 is configured with a BMC 132, a hardware device 206a that is capable of communicating using the SPDM protocol, and a fixed pass-through driver 830, such as one provided for use with processor devices having a VT-d fixed pass-through feature provided by INTEL or an I/O management unit (IOMMU) fixed pass-through feature provided by AMD. Although only one hardware device 206 is shown and described, it should be understood that the method 800 can be practiced with any quantity of hardware devices 206, such as two or more SPDM enabled hardware devices 206.

At step 802, a communication channel is established between the workspace orchestration system 504 and a PCIe device driver 830 associated with the workspace 506. In one embodiment, the communication channel may be established using a virtual machine communication interface (VMCI) provided by VMWARE. At step 804, the BMC software agent 202 communicates with the workspace orchestration system 504 to setup a subscription to certain operational characteristics detected by the PCIe device driver 830. In one embodiment, the BMC software agent 202 may setup a subscription to a device manager (e.g., vmkdevmgr provided by VMWARE) using a custom kernel ioctl command or using a vmkernel callback API. Additionally, the device manager of the workspace orchestration system 504 may be subscribed to a PCI Advanced Error Reporting (AER) root driver. At this point, a communication channel is established between PCIe AER root driver and the BMC 132 via the BMC software agent 202 and device manager of the workspace orchestration system 504 such that the BMC 132 may receive and process uncorrectable errors generated by the fixed pass-through configuration 510 of the workspace 506.

At step 806, the workspace orchestration system 504, via the PCI AER root driver determines that an uncorrectable error (e.g., operational characteristics event) has occurred with the fixed pass-through configuration 510 of hardware device 206. In one embodiment, the device manager of the workspace orchestration system 504 possesses the ability to know whether the operational characteristics event is a correctable or an uncorrectable error using AER's severity status bit. When this occurs, the workspace orchestration system 504 sends this information along with identity information associated with the hardware device 206 to the BMC software agent 202 at step 808. In one embodiment, the workspace orchestration system 504 may send PCI block/device/function (BDF) information that uniquely identifies the affected hardware device 206 on the PCIe system bus.

At step 810, the BMC software agent 202 forwards this information to the BMC 132, which determines whether the operational characteristics event is indicative of a security breach at step 812. In one embodiment, the BMC 132 determines that if the AER portion of the workspace orchestration system 504 reports an error and if the BMC 132 SEL is not reported with a valid PCIe fatal error, the operational characteristics event will be treated as a security breach. In such a case, the BMC 132 disables the trust (quarantines) of the hardware device 206 at step 814. For example, the I/O operations of the hardware device 206 may be disabled, such as described above with reference to step 356 of FIG. 3 or step 454 of FIG. 4.

Additionally, the BMC software agent 202 may further quarantine the hardware device 206 by performing a detach operation of the hardware device 206 from the system at steps 816, 818, and 820. For example, the BMC 132, via the BMC software agent 202, may communicate with the device manager (e.g., vmkdevmgr) of the workspace orchestration system 504 to initiate a PCIe device driver detach operation against the specific hardware device 206 to stop its I/O and detach the device from the device layer. At step 822, the BMC 132 may communicate with the BMC software agent 202, that in turn, communicates with the ACPI layer of the IHS 500 to initiate an ACPI_OSC method to turn off the hardware device 206 by setting its ACPI device state (e.g., D3 cold) at step 824.

Although the methods 700 and 800 of FIGS. 7 and 8, respectively, each describe an example method that may be performed for managing event messages, the features of the methods 700 and 800 may be embodied in other specific forms without deviating from the spirit and scope of the present disclosure. For example, either of the methods 700 and 800 may perform additional, fewer, or different operations than those described in the present examples. As another example, certain steps of the methods 700 and 800 may be performed by other components in the IHS 100 other than those described above.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a plurality of hardware devices; and a Baseboard Management Controller (BMC) in communication with the plurality of hardware devices, the BMC comprising instructions that are executable by at least one processor to:

monitor one or more operating characteristics of at least one hardware device of the plurality of hardware devices to determine whether or not a fault comprising the one or more operating characteristics has been occurring at a rate that exceeds a specified threshold, wherein the at least one hardware device is operating in a fixed pass-through configuration with a workspace, wherein the workspace has been instantiated by a workspace orchestration service executed on the IHS, and wherein the one or more operating characteristics comprise at least one of: an input/output (I/O) device fault, a correctable error, an uncorrectable error, an improper memory access request, or a page fault, and wherein the at least one hardware device comprises a Security Protocol and Data Model (SPDM)-enabled hardware device;

perform a mutual authentication procedure with the SPDM-enabled hardware device to form a SPDM-based trusted network between the SPDM-enabled hardware device and the BMC;

determine that the operating characteristics are indicative of a security breach of the fixed pass-through configuration; and perform an operation to quarantine the at least one SPDM-enabled hardware device when the fixed pass-through configuration is determined to possess the security breach by maintaining the quarantined at least one SPDM-enabled hardware device in a quarantine state until a firmware update procedure has been performed on the at least one SPDM-enabled hardware device.

2. The IHS of claim 1, wherein the instructions are further executed to perform the operation to quarantine the at least one hardware device by removing the SPDM-enabled hardware device from the SPDM-based trusted network.

3. The IHS of claim 1, wherein the instructions are further executed to perform the operation to quarantine the at least one hardware device by performing a device detach operation on the SPDM-enabled hardware device.

4. The IHS of claim 1, wherein the instructions are further executed to perform the operation to quarantine the at least one hardware device by setting an Advanced Configuration and Power Interface (ACPI) state of the SPDM-enabled hardware device to an off state.

5. The IHS of claim 1, wherein the fixed pass-through configuration comprises a Peripheral Component Interconnect Express (PCIe) pass-through configuration.

6. The IHS of claim 1, wherein the fault comprises at least one of an input/output memory management unit (IOMMU) page fault, a VT-d page fault, or a Peripheral Component Interconnect Express (PCIe) uncorrectable error.

7. A fixed pass-through monitoring method comprising:
monitoring, using instructions stored in at least one memory and executed by at least one processor, one or more operating characteristics of at least one hardware device of a plurality of hardware devices to determine whether or not a fault comprising the one or more operating characteristics has been occurring at a rate that exceeds a specified threshold, wherein the at least one hardware device is operating in a fixed pass-through configuration with a workspace using a Baseboard Management Controller (BMC) in communication with the plurality of hardware devices of an Information Handling System (IHS), wherein the workspace has been instantiated by a workspace orchestration service executed on the IHS, wherein the one or more operating characteristics comprise at least one of: an input/output (I/O) device fault, an improper memory access request, or a page fault, and wherein the at least one hardware device comprises a Security Protocol and Data Model (SPDM)-enabled hardware device;

performing a mutual authentication procedure with the SPDM-enabled hardware device to form a SPDM-based trusted network between the SPDM-enabled hardware device and the BMC;

determining, using the instructions, that the one or more operating characteristics are indicative of a security breach of the fixed pass-through configuration, based at least in part on determining that at least one of the one or more operating characteristics represents an uncorrectable error; and performing, using the instructions, an operation to quarantine the at least one SPDM-enabled hardware device when the fixed pass-through configuration is determined to possess the security breach by maintaining the quarantined at least one SPDM-enabled hardware device in a quarantine state until a firmware update procedure has been performed on the at least one SPDM-enabled hardware device.

8. The fixed pass-through monitoring method of claim 7, further comprising performing the operation to quarantine the at least one hardware device by removing the SPDM-enabled hardware device from the SPDM-based trusted network.

9. The fixed pass-through monitoring method of claim 7, further comprising performing the operation to quarantine the at least one hardware device by performing a device detach operation on the SPDM-enabled hardware device.

10. The fixed pass-through monitoring method of claim 7, further comprising performing the operation to quarantine the at least one hardware device by setting an Advanced Configuration and Power Interface (ACPI) state of the SPDM-enabled hardware device to an off state.

11. An Information Handling System (IHS), comprising:
first and second Security Protocol and Data Model (SPDM)-enabled hardware devices, the first SPDM-enabled hardware device comprising instructions that are executable by at least one processor to:
monitor one or more operating characteristics of the second SPDM-enabled hardware device, to determine whether or not a fault comprising one or more operating characteristics has been occurring at a rate that exceeds a specified threshold, wherein the second SPDM-enabled hardware device is operating in a fixed pass-through configuration with a workspace, wherein the workspace has been instantiated by a workspace orchestration service executed on the IHS, and wherein the one or more operating characteristics comprise at least one of: an input/output (I/O) device fault, an improper memory access request, or a page fault;

perform a mutual authentication procedure with the second SPDM-enabled hardware device to form a SPDM-based trusted network between the second SPDM-enabled hardware device and the BMC;

determine that the operating characteristics are indicative of a security breach of the fixed pass-through configuration, wherein the determination is based at least in part on determining that at least one of the one or more operating characteristics represents an uncorrectable error, using error severity information obtained from an interface bus configured to be coupled with the second hardware device; and perform an operation to quarantine the second SPDM-enabled hardware device when the fixed pass-through configuration is determined to possess the security breach by maintaining the quarantined second SPDM-enabled hardware device in a quarantine state until a firmware update procedure has been performed on the second SPDM-enabled hardware device.

12. The IHS of claim 11, wherein the instructions are further executed to perform the operation to quarantine the second SPDM-enabled hardware device by at least one of removing the second SPDM-enabled hardware device from the SPDM-based trusted network, performing a device detach operation on the second SPDM-enabled hardware device, or by setting an Advanced Configuration and Power Interface (ACPI) state of the second SPDM-enabled hardware device to an off state.

* * * * *